(12) United States Patent
Thuli et al.

(10) Patent No.: US 6,830,350 B2
(45) Date of Patent: Dec. 14, 2004

(54) OPTICAL COMPONENT AND FABRICATION OF SUCH A COMPONENT

(75) Inventors: Thomas Thuli, Plons (CH); Stefan Schrauf, Feldkirch-Gisingen (AT); Heinz Good, Chur (CH)

(73) Assignee: Unaxis Balzers Ltd., Balzers (LI)

( * ) Notice: Subject to any disclaimer, the term of this patent is extended or adjusted under 35 U.S.C. 154(b) by 129 days.

(21) Appl. No.: 10/083,173

(22) Filed: Feb. 26, 2002

(65) Prior Publication Data

US 2002/0141686 A1 Oct. 3, 2002

(30) Foreign Application Priority Data

Mar. 3, 2001 (CH) .......................................... 2001-0401

(51) Int. Cl.[7] ................................................ G02B 5/08
(52) U.S. Cl. ........................ 359/838; 359/896; 385/16; 156/107
(58) Field of Search ................................ 359/838, 896; 385/16, 18, 52; 257/466; 156/107

(56) References Cited

U.S. PATENT DOCUMENTS

| | | | | |
|---|---|---|---|---|
| 4,063,268 A | * | 12/1977 | King | .......................... 257/226 |
| 4,092,060 A | * | 5/1978 | Nunoshita | ....................... 385/7 |
| 5,250,321 A | | 10/1993 | Andersson et al. | |
| 6,076,933 A | | 6/2000 | DiLoreto et al. | |
| 2002/0114580 A1 | * | 8/2002 | Case | ........................... 385/52 |

FOREIGN PATENT DOCUMENTS

| | | |
|---|---|---|
| DE | 37 03 087 A1 | 2/1987 |
| EP | 0 949 648 A1 | 10/1999 |
| EP | 0 969 309 A1 | 1/2000 |
| GB | 2279763 | * 1/1995 |

* cited by examiner

Primary Examiner—Leo Boutsikaris
(74) Attorney, Agent, or Firm—Pearne & Gordon LLP

(57) ABSTRACT

The invention relates to an optical component (1) consisting of a base unit (3) which supports a substrate (5) with a substrate region (7) that encompasses an optically functional surface, and a coating (9) which covers the substrate region (7) and at least part of the base unit (3). The substrate region (7) and a reference point (13) in the base unit (3) are oriented relative to each other in predefined fashion. The optical component (1) is produced by assembling the base unit (3) and the substrate (5) prior to the coating process, preferably by means of an assembly device (17). The assembled component is subsequently coated by employing a vacuum coating technique.

13 Claims, 4 Drawing Sheets

Fig. 4a
Fig. 4b
(i)  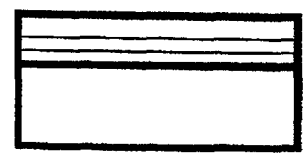
(ii)  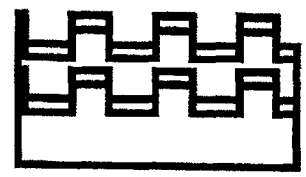
(iii) 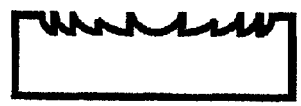 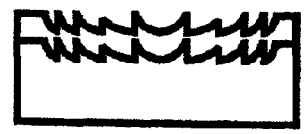

OPTICAL COMPONENT AND FABRICATION OF SUCH A COMPONENT

BACKGROUND OF THE INVENTION

This invention relates to an optical component the characterizing feature of which is specified in claim 1, and to a method per claim 9 for fabricating such an optical component.

Optical components are widely employed for instance in the realm of telecommunications. These components may be in the form of solid modules performing an optical function for which they feature at least one optically functional surface. However, these components may also contain moving parts so that they must additionally satisfy certain mechanical requirements. A typical example where mechanically moving elements must be accommodated is the optomechanical switch which is frequently employed in telecommunications systems. These components must usually meet rigid requirements in terms of functional precision and, consequently, of the precision with which they are manufactured. In many cases, particularly demanding requirements must be met with regard to the attainability and maintainability of the desired level of their reflective properties and to their angular tolerances.

As employed in prior art, components of this type can be produced as one-piece light-metal elements whenever the optical surface is to be reflective. To that effect, a plane reflective surface can be produced in the appropriate region of the element and may be given a mirror polish. The reflective surface must be particularly smooth, i.e. level with a minimum of surface roughness so as to prevent light scattering, given that in general the mirrors produced are quite small, with surfaces typically on the order of $3 \times 10^2$ or less. Fabricating that type of mirror involves relatively complex metal-working processes such as diamond-machining in order to obtain the necessary surface quality and surface precision. This entails a relatively high cost of production and perhaps a correspondingly high reject rate.

To avoid this disadvantage, the German utility patent GB 20010594.9 introduces an optomechanical switch in which the component consists of a base unit without any optically functional surface but provided with a glass substrate which does have an optically functional surface. It is thus possible to produce high-quality glass surfaces at low cost employing conventional polishing techniques, obviating the need for any complex metalworking processes for producing the reflective components. Reference is made to established, sophisticated methods for coating this type of glass element with a highly reflective, optically excellent mirror surface. In this fashion, as the document explains, it is possible to polish, clean and coat glass substrates, and according to an enhanced version of that invention, the process also permits the reflective coating of large glass substrates. In thin-film technology, for example, the method of preference is usually to coat large substrates which, after the coating, are cut to size and separated into numerous small components. The advantage of this approach lies in the fact that loading and unloading large substrates on the coating equipment requires fewer operating steps, thus reducing the time needed for loading the coating equipment. Moreover, every substrate must be placed on a support, where the necessary tooling is more easily implemented for large substrates. Each such support is of a particular geometric size and occupies in the coating machine an area that cannot be utilized for the coating of substrates. Where for small substrates a great many supports are needed, they usually occupy a large combined area. It follows that when coating large substrates, the effectively coated substrate area is at times larger by a multiple factor.

One advantage of the approach described in the utility patent is the separation of the mirror-coating process from the fabrication of the base unit. Producing the base unit is thus made easier, more efficient and more cost-effective. This separation does have a drawback in that the substrates, once coated, must then be cut to size, separated and mounted on the base unit. The term mounting in this case refers to the assembly of two or more parts into one component which is appropriately called an assembly. The mounting process typically involves numerous handling operations, such handling including the grasping, conveying, relocating and in general the manipulation of parts. In some cases it is necessary to apply layered systems which offer only marginal resistance to mechanical or chemical effects. This is particularly disadvantageous when the assembly process does not make it possible, or at substantial expense only, to avoid such effects, or whenever the assembly process leads to the need for another cleaning. If the coating is damaged in the process, the optical component will of course be of a lower quality and in case of doubt it may have to be scrapped.

SUMMARY OF THE INVENTION

It is the objective of the invention here presented to eliminate the drawbacks inherent in prior art. As a particular objective, the optical component is to be so constructed that any handling and assembly problems can be avoided or minimized without compromising the required high level of optical precision of the component, while the production method employed is to be highly cost-effective.

According to the invention, the objective is achieved by the approach taken per claims 1 and 9. The subclaims cover desirable enhancements.

In the approach according to this invention, the coating of the substrates supporting the optically functional surface is moved as close as possible to the end of the process chain, which is accomplished by coating not only the substrates but the assembled component as a whole. Accordingly, the process of fabricating the optical component can be summarized to include the following steps:

a) Manufacturing the base unit;
b) Producing a substrate with an optical surface;
c) Attaching the substrate to the base unit, preferably by cementing it on, to thus make up the component;
d) Coating the component, including the optical surface of the substrate, by a vacuum coating process.

The result is an optical component consisting of a base unit supporting a substrate of which at least one region features an optically functional surface coated with a reflective layer in such fashion that the said coating extends at least in part beyond the substrate and onto the base unit. The optically functional surfaces concerned include in particular those surfaces which, depending on their intended optical function, reflect, transmit, absorb, refract or diffract the incident light. Hence, the optically functional surface may be a mirror, a color filter, a polarizing beam splitter, a lens or in general any refractive or diffractive element. In many cases, as yet uncoated substrates are less susceptible to damage by mechanical or chemical effects than are coated substrates. It follows that an uncoated substrate can be accurately mounted by means of a correspondingly precise assembly device. The process allows for the optically functional surface of the substrate and a fiducial reference point on the base unit to be mutually aligned in predefined fashion, with emphasis on precise orientation. In other words, the reflective substrate region on the optical component is positioned in predefined fashion relative to a reference point on the base unit. This reference point is preferably constituted of two plane reference surfaces. The substrate is preferably cemented onto the base unit. The cement layer bonding the substrate with the base unit fixes the orientation and can in fact serve to correct for variations in the space between the substrate and the base unit. Therefore, the surface regions on the substrate and on the base unit which are to be bonded together do not have to be perfectly precise for the purpose of orientation, which in turn simplifies the production of both the substrate and the base unit.

BRIEF DESCRIPTION OF THE DRAWINGS

The following explains this invention in more detail with the aid of examples and of schematic diagrams in which—

FIG. 2b is a top view of the assembly device per FIG. 2a;

FIG. 3b is a schematic illustration of the mode of operation of the optical switch per FIG. 3a;

FIG. 4a shows three different variations of substrate surfaces: (i) plane surface, (ii) surface with a periodic lattice structure, (iii) surface with a Fresnel lens.

FIG. 4b shows three surfaces per FIG. 4a after the application of the optical layer.

DETAILED DESCRIPTION OF THE INVENTION

Figure 3A:
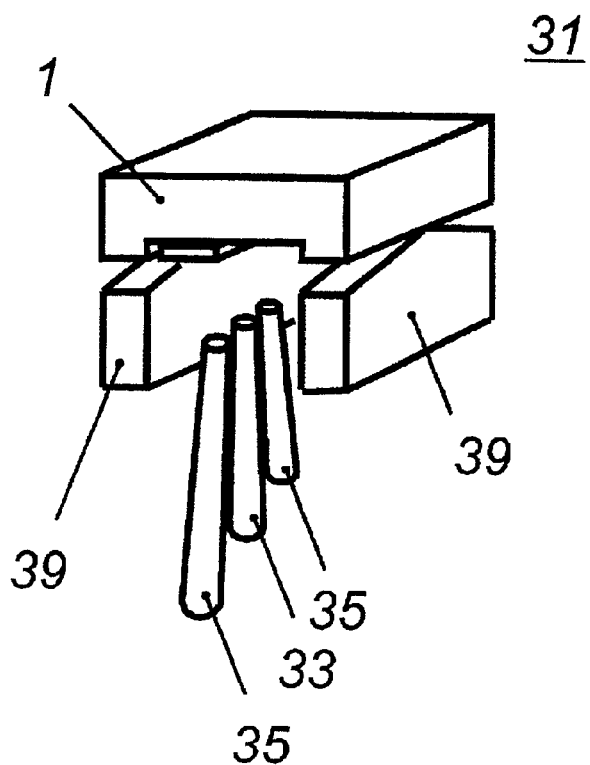
FIG. 3a illustrates an optical switch whose moving part is constituted of an optical component per this invention.
Figure 3B:
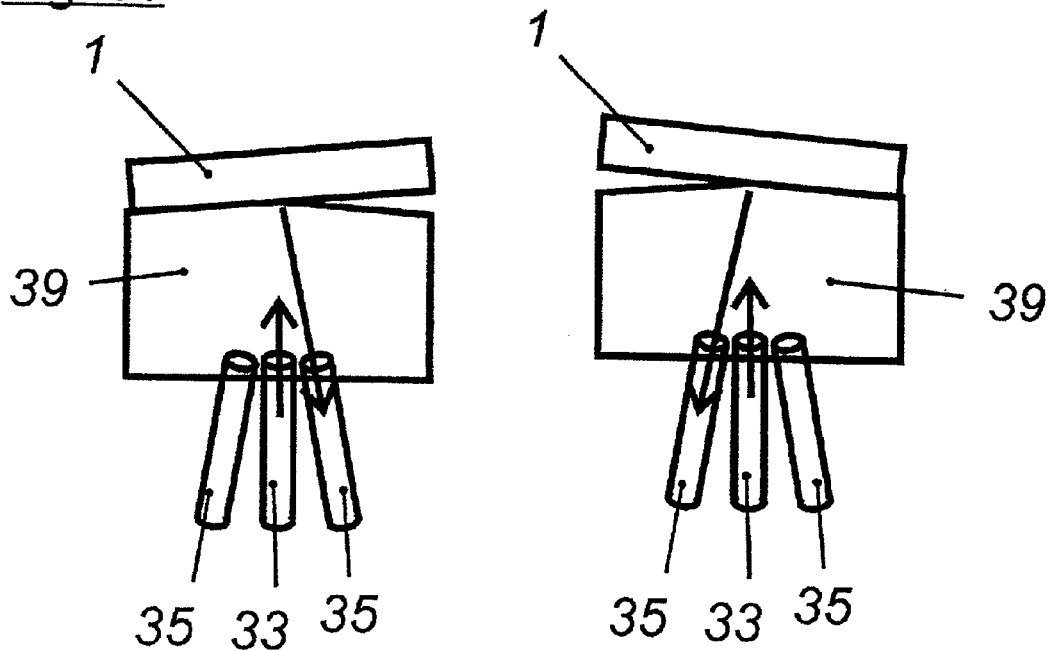

The following describes an example of how an optical component 1 per this invention, constituting the moving part of an optical switch 31, can be fabricated. The optical component 1 is movably positioned on the roof-shaped supports 37 of the switch 31. A switch 31 of that type is depicted in FIG. 3a. In telecommunications applications, this switch 31 serves to selectively divert light emanating from a first fiber optic cable 33 into another fiber optic cable 35 positioned on either side of the first cable 33. This function is schematically illustrated in FIG. 3b.

Figure 1A:
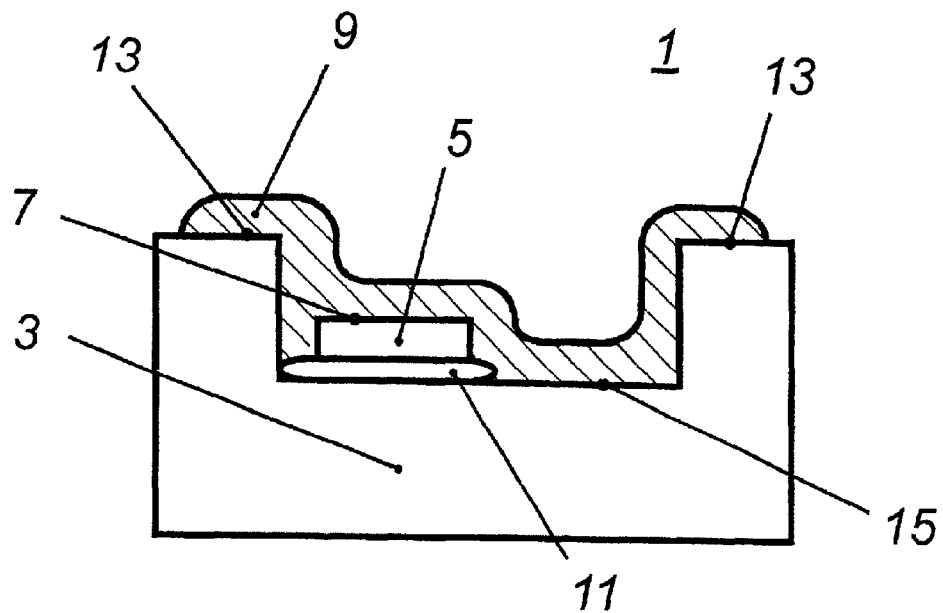
FIG. 1a is a cross-section view of an optical component per this invention.
Figure 1B:
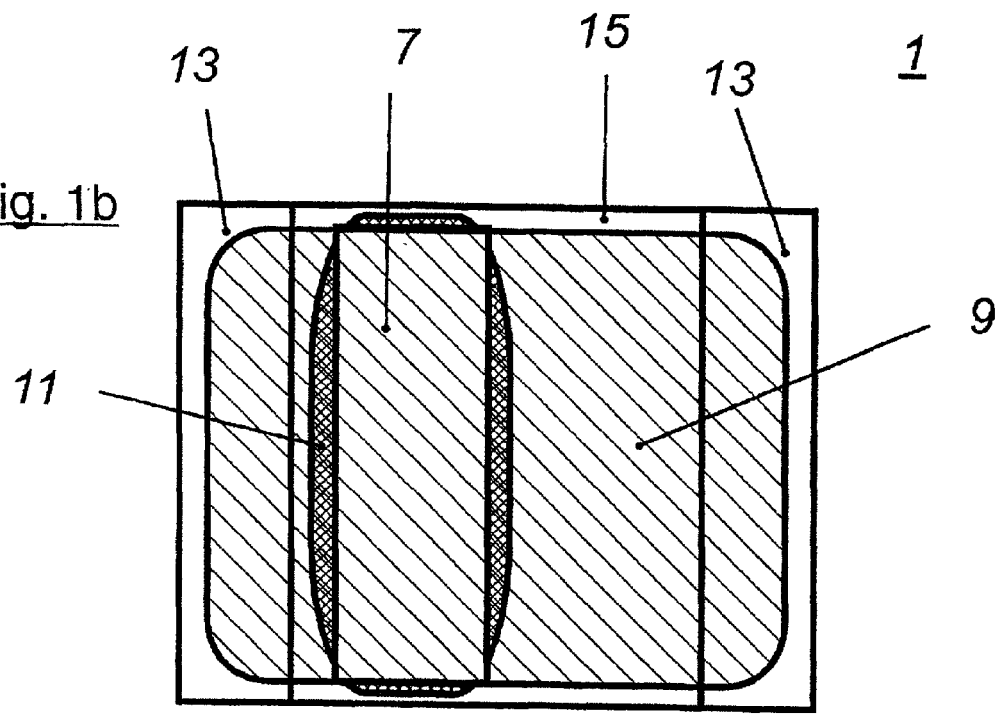
FIG. 1b is a top view of one possible version of the optical component.

The optical component 1 per this invention, required for the switch 31, is shown in more detail in the cross-sectional illustration of FIG. 1a. The base unit 3 is a U-shaped piece of material. For reasons of easy workability, it may consist for instance of aluminum, but other materials, and especially plastics, are equally suitable. A substrate 5 is mounted on the base unit 3. In the example shown, the substrate 5 consists of glass. The reference point 13 on the base unit 3 is an important part of the optical component per this invention since it is located on the flanks of the switch 31 and defines the orientation of the substrate 5. In the example at hand the reference point 13 is constituted of two surfaces. The top view in FIG. 1b clearly shows these reference surfaces. The substrate 5 and especially the substrate region 7 within the optical component 1 must be oriented as precisely as possible relative to the reference point 13 so as to ensure that no subsequent adjustment is necessary for an efficient operation of the switch to optimally guide the light beam into the appropriate fiber optic cable. To achieve this precision, the uncoated substrate 5 is mounted on the base unit 3 by means of an assembly device 17. The assembled elements are then coated to form the finished optical component 1, in the process of which the coating 9 extends beyond the substrate 5, covering parts of the base unit 3. In the example at hand, the coating 9 serves to turn the substrate region 7 into a mirror. For illustrative reasons, FIG. 1 shows the coating 9 with an exaggerated thickness. The typical thickness of a substrate is in the millimeter range whereas the thickness of such a reflective layer 9 is usually measured in micrometers.

The layer can be applied by a vacuum coating method such as an evaporative or a sputtering process. However, chemical vapor deposition (CVD) or plasma enhanced CVD (PECVD) techniques are equally possible. Vacuum coating has the advantage that it is a very flexible process, adaptable to variable applicational requirements. It permits the fabrication of mirrors of high optical quality and, if necessary, even with specific spectral response characteristics. Another advantage may be the fact that in these coating techniques the optical layer is usually applied by a narrowly dimensioned coating system which coats only the side of the optical component 1 that faces it. This allows for the definition of regions on the base unit 3 which must not be coated, an example being base units which in addition to their optical and mechanical functions must also serve as electrical contacts. In the case of immersion coating, for instance when employing the sol-gel process, the entire base unit 3 would be coated with a nonconducting layer, making its use as an electrical contact rather difficult.

Figure 2A:
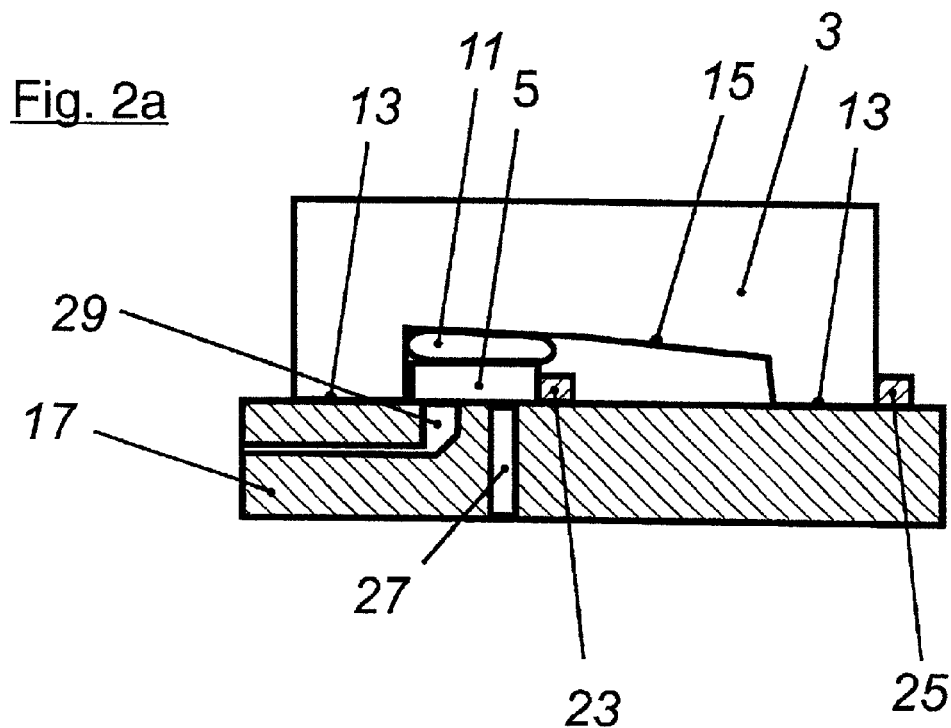
FIG. 2a is a cross-section view of an assembly device for the component.
Figure 2B:
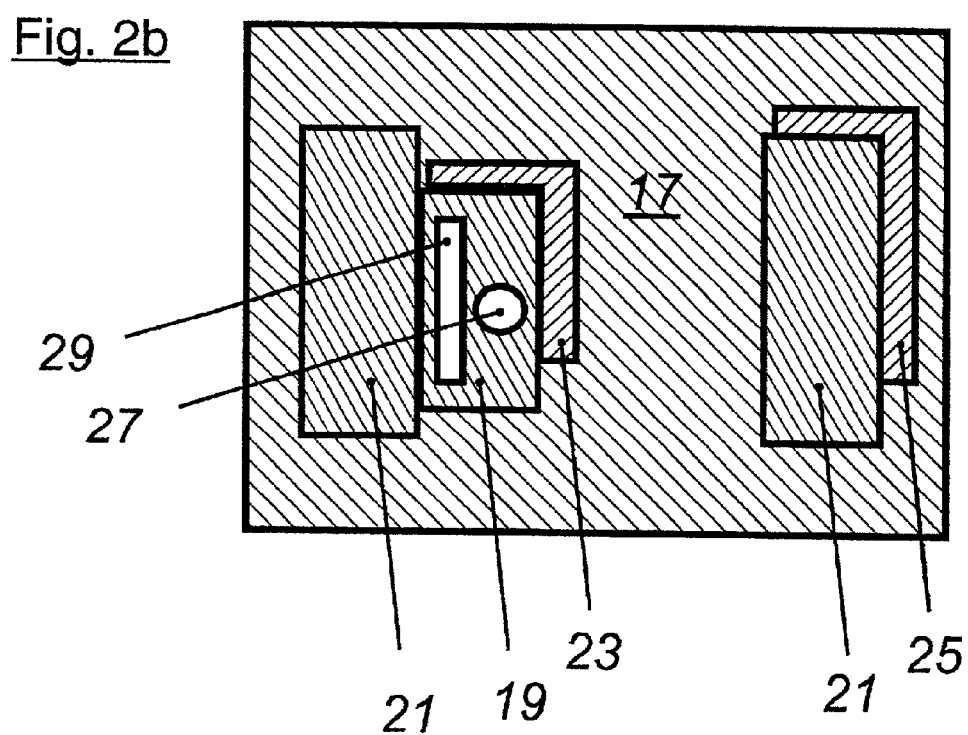

The coating is one of the last steps in the process chain for producing the optical component 1. All assembly steps are performed on uncoated parts. Consequently, the assembly process cannot damage any layer system. This in turn permits the use of the assembly device 17 of which a cross-section view is shown in FIG. 2a and a top view in FIG. 2b. The assembly device 17 consists essentially of a support plate 19 and a counterpart 21 matching the reference surface 13 of the base unit 3. For assembling the substrate 5 and the base unit 3, the substrate 5 is placed on the assembly device 17 in such fashion that the substrate region 7 is in contact with the support plate 19. This is followed by the application of an adhesive, preferably an optical adhesive, on the substrate 5, whereupon the base unit 3 is placed with its reference surface 13 on the reference counterpart 21, with an adhesive layer 11 forming between the substrate-contacting interface 15 and the substrate 5 proper, as shown in FIG. 2a.

To simplify the positioning of the substrate 5 and the base unit 3 on the assembly device 17, the latter may be equipped with jigs 23 for the adjustment of the substrate 5 and with jigs 25 for the adjustment of the base unit 3, which jigs may be for instance in the form of stops along which the substrate 5 and, respectively, the base unit 3 can be laterally aligned. In that arrangement, the base unit 3 and the substrate 5 will then be held in a fixed position relative to each other, so that the precision of the mutual orientation of the substrate 5 and the reference point 13 depends only on the precision with which the assembly device was machined. If the reference surface 13 of the base unit 3 is curved, an orientation with angular deviations of less than 0.25 degrees is attainable. If the reference surface 13 is plane, angular deviations of below 0.15 degrees can be achieved when that surface is to be oriented parallel to the substrate region 7. An even more precise parallel orientation of the substrate 5 relative to the reference surface 13 is possible when the support plate 19 of the assembly device 17 consists of quartz where the substrate 5 can be molded. As a prerequisite for that the substrate region 7 must be a polished glass surface. For substrates up to 1 cm² in size this permits the attainment of angle deviations of less than 0.033 degrees.

FIG. 2 illustrates a version of the assembly device 17 that is suitable for a particularly simple situation: The reference point 13 of the base unit 3 consists of two plane surfaces which extend in the same plane as the substrate region 7. In the example shown, the advantage for the optical switch 31 consists in the fact that in the switching operation the axis of rotation is located in the same plane as well, permitting simple beam switching. Generally, however, the base unit 3 may be of virtually any conceivable geometric configuration. For example, the base unit 3 itself may be provided with a cylindrical structure which constitutes the mechanical axis of rotation while also serving as a suitable reference point 13 for the assembly process.

The substrate 5 on its part may be configured in the most diverse fashion. This applies both to the geometry of the substrate which, inter alia, can include curved surfaces and thus lenses, and to the nature of the substrate region 7. The latter may conceivably include smooth surfaces, textured surfaces and especially microstructured surfaces, meaning structural-pattern sizes in or even below the micrometer range. FIGS. 4a and 4b show three different variations of such a surface: One unstructured (i), one with a diffraction grating (ii) and one with a Fresnel lens (iii). In each case the surface in FIG. 4a is uncoated, in FIG. 4b the surface is coated, with the coating applied, according to this invention, after the substrate 5 was mounted on a base unit 3. When a substrate 5 has a structured i.e. contoured surface, the surface of the support plate 19 of the assembly device 17 must match that contour. This can be accomplished for instance by precipitating on the substrate a metallic layer, typically a millimeter or so thick, using conventional galvanization techniques, and incorporating the resulting replica in the assembly device. Under certain circumstances it may not be necessary in this transfer process to separate the substrate 5 from the replica prior to the assembly operation. For structured or contoured as well as unstructured substrates 5 it may be advantageous to provide the assembly device 17 with an attachment which during the assembly process locks the substrate 5 in place on the support plate 19. In the example shown in FIG. 2, this is accomplished by means of a gas port 27 in the assembly device 17. That gas port has an opening in the area of the support plate 19 which opening is covered by the substrate 5 when the latter is properly aligned. When a vacuum is applied on the gas port 27, it holds the substrate in place. A similar approach could be used for the base unit 3 as well, although it would only rarely be necessary.

One of the advantages of the process per this invention lies in the fact that the geometry of the substrate-contacting interface 15 of the base unit 3 and the geometry of the region of the substrate 5 that is to be bonded to the base unit 3, are of secondary significance. This is attributable to the fact that the assembly device 17 ensures the proper orientation of the substrate region 7 of the substrate 5 relative to the reference point 13 of the base unit 3, while the adhesive layer 11 used for cementing the parts together permits compensation for any defects or any variations in the space between the substrate 5 and the substrate-contacting interface 15.

A variety of adhesives can be used for the cementing. Available options include two-component adhesives. To be sure, when the two components are mixed, the assembly process must take place rather quickly, a fact that is not conducive to an efficiently automated assembly process. It is therefore particularly desirable to use an optical adhesive which cures when exposed to ultraviolet (UV) light. Once the substrate 5 has been cemented to the base unit 3, the latter can be irradiated with UV light, curing the cement. For the purpose of this irradiation, the assembly device 17 can be equipped with a light source 29 for instance in the form of a light tunnel as shown in FIG. 2. If the substrate 5 consists of a transparent material, the light tunnel can terminate at the surface of the support plate 19 of the assembly device 17. Here again, it helps that the substrate 5 has not yet been coated since the light can pass through it unobstructed to cure the optical adhesive. If the assembly device 17 is transparent, light can pass through it for the curing process without requiring any auxiliary measures. Where practical, the gas port 27 can double as a light tunnel and serve to cure the cement. Once assembled, the optical component, and with it the substrate region 7, is coated. The result is the creation of an optically functional surface in the substrate region 7, i.e. that surface attains optical functionality. Depending on the intended functionality, impinging light will be reflected, transmitted, absorbed, refracted or diffracted. Accordingly, the optically functional surface may be a mirror, a color filter, a polarizing beam splitter, a lens or, in general, a refractive or a diffractive element.

What is claimed:

1. An optical component (1), comprising a base unit (3); a substrate (5) supported by the base unit, the substrate having an optically functional surface in at least one substrate region (7); and a coating (9) on the substrate that extends at least in part beyond the substrate (5) and onto the base unit (3) wherein the substrate region (7) is located in predefined fashion in a specific relationship to a reference (13) on the base unit (3) which reference (13) is defined by two plane reference surfaces on the base unit (3), wherein orientation of the substrate region (7) deviates from an orientation that is selectable relative to the reference (13) by not more than 0.25 degrees.

2. An optical component (1), comprising a base unit (3); a substrate (5) supported by the base unit, the substrate having an optically functional surface in at least one substrate region (7) ; and a coating (9) on the substrate that extends at least in part beyond the substrate (5) and onto the base unit (3) wherein the substrate region (7) is located in predefined fashion in a specific relationship to a reference (13) on the base unit (3) which reference (13) is defined by two plane reference surfaces on the base unit (3), wherein the substrate region (7) is planar and the reference (13) comprises one or several plane surfaces on the base unit (3), where all surfaces comprising the reference (13) are parallel to one another and to the substrate region (7) within an angular tolerance of 0.15 degrees.

3. The optical component (19) as in claim 2, wherein the reference (13) and the substrate region (7) extend in one plane.

4. The optical component (1) as in claim 1 or 2, wherein the substrate (5) comprises a glass substrate with a structured surface.

5. The optical component (1) as in claim 1 or 2, wherein the functional surface in the substrate region (7) has the optical function of a mirror, a color filter, a polarizing beam splitter, a refractive or a diffractive element.

6. An optical switch (31) incorporating the optical component (1) as in claim 1 or 2.

7. A method for fabricating an optical component (1), comprising the steps of:

a) producing a base unit (3);

b) producing a substrate (5) with an optically functional surface in a substrate region (7);

c) assembling the substrate (5) and the base unit (3) into a component; and d) coating the component including the optical surface of the substrate (5) in a vacuum coating process so that the coating extends at least in part beyond the substrate (5) and onto the base unit (3); wherein for assembling the substrate (5) with the base unit (3), an assembly device (17) is used that contains a support plate (19) with which the substrate region (7) is brought into contact, said assembly device (17) containing a counterpart (21) for a reference (13) of the base unit, wherein the counterpart is brought into contact with the reference (13), with the support plate (19) and the counterpart (21) remaining in a rigid position relative to each other at least during the step of assembling the substrate (5) and the base unit (3), while the substrate region (7) and the reference (13) on the base unit (3) are positioned in relation to each other in a manner predefined by the assembly device (17).

8. The method as in claim 7, wherein by means of a first adjustment jig (23) provided on the assembly device (17) the substrate (5) is aligned on the support plate (19).

9. The method as in claim 8, wherein by means of a second adjustment jig (25) the reference (13) of the base unit (3) is aligned on the counterpart (21).

10. The method as in one of the claims 7 or 8, wherein as the substrate (5) is produced, a polished glass surface is generated in at least a partial area of the substrate region (7), and for assembling the substrate (5) with the base unit (3) an assembly device (17) is employed which at least in a surface area of the support plate (19) consists of quartz and that the polished glass surface of the substrate region (7) is molded thereon.

11. The method as in one of the claims 7 or 8, wherein upon contact between the substrate region (7) and a surface of the support plate (19), a negative pressure is created in a gas port (27) provided in a surface of the support plate (19) of the assembly device (17), as compared to ambient atmospheric pressure around the assembly device (17), whereby, during assembly with the base unit (3), the substrate (5) is held in position on the support plate (19).

12. The method as in one of the claims 7, 8 or 9, wherein for assembling the substrate (5) with the base unit (3) an adhesive layer (11) is used which comprises a UV-curing cement and which at least in part fills a space between the substrate (5) and a substrate-accepting interface (15) of the base unit (3), firmly compensating for any height variations of that space.

13. The method as in one of the claims 7, 8 or 9, wherein the substrate (5) and the base unit (3) are assembled by means of a UV-curing adhesive cement and that the substrate (5) is irradiated, via the assembly device (17) or by a light source (29) incorporated in the assembly device (17) or through a gas port (27), causing the adhesive cement to cure.

* * * * *

UNITED STATES PATENT AND TRADEMARK OFFICE
CERTIFICATE OF CORRECTION

PATENT NO. : 6,830,350 B2
DATED : December 14, 2004
INVENTOR(S) : Thomas Thuli, Stefan Schrauf and Heinz Good It is certified that error appears in the above-identified patent and that said Letters Patent is hereby corrected as shown below:

<u>Title page,</u>
Item [56], References Cited, FOREIGN PATENT DOCUMENTS, please delete "EP   0 969 309 A1   1/2000" and insert therefor -- EP   0 969 306 A1   1/2000 --.

Signed and Sealed this

Thirtieth Day of August, 2005

JON W. DUDAS
*Director of the United States Patent and Trademark Office*